April 17, 1934.  B. E. CARL ET AL  1,955,272
APPARATUS FOR THE RECOVERY OF ALUMINUM CHLORIDE FROM THE
RESIDUE OF ALUMINUM CHLORIDE OIL REFINING
Original Filed Jan. 14, 1927
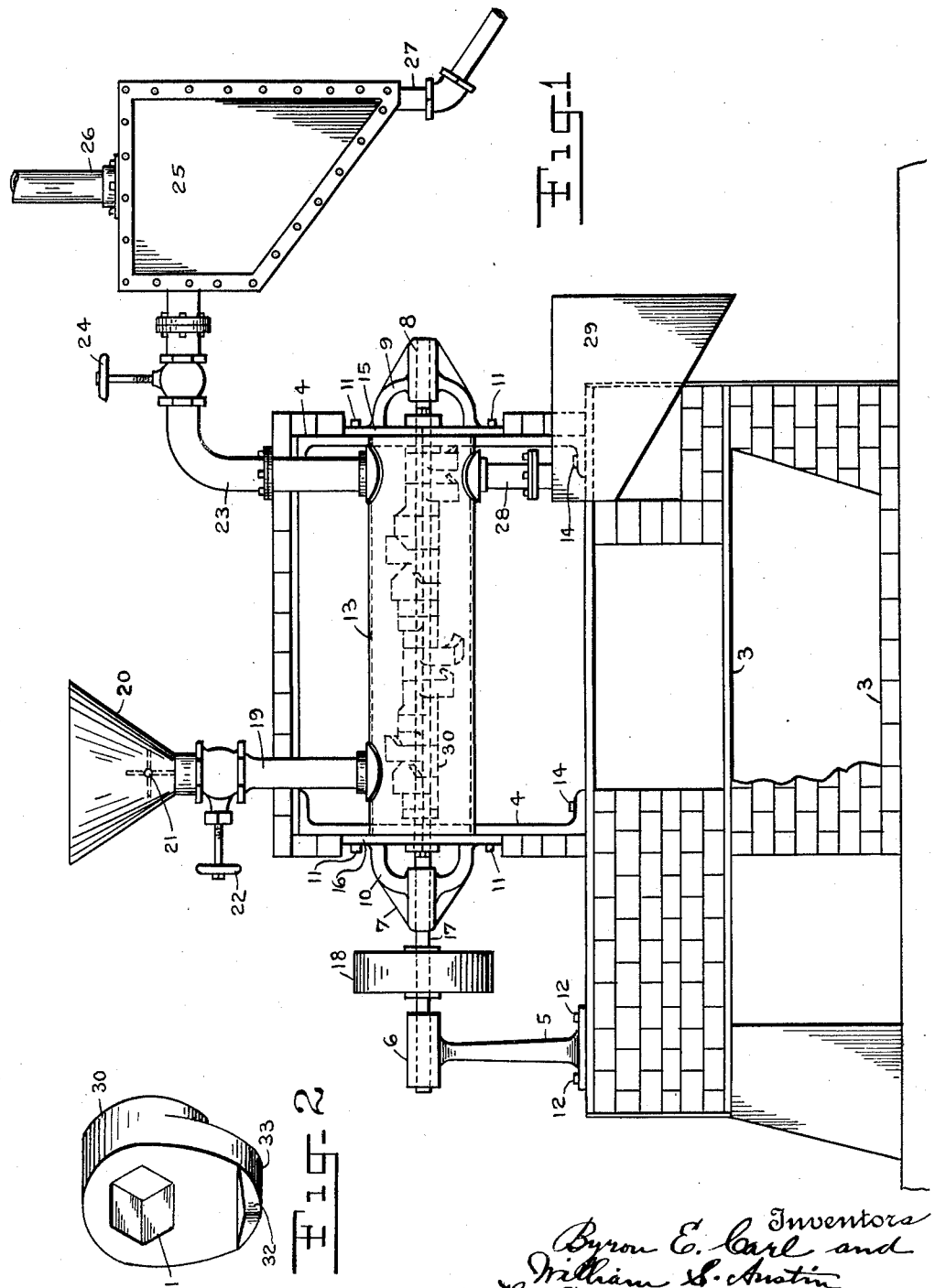

Patented Apr. 17, 1934

1,955,272

UNITED STATES PATENT OFFICE 1,955,272

APPARATUS FOR THE RECOVERY OF ALUMINUM CHLORIDE FROM THE RESIDUE OF ALUMINUM CHLORIDE OIL REFINING

Byron E. Carl, New York, N. Y., and William S. Austin, Newark, N. J., assignors to Aluminum Chloride Oil Refining Corporation, New York, N. Y., a corporation of Delaware Original application January 14, 1927, Serial No. 161,078, now Patent No. 1,835,279. Divided and this application January 5, 1928, Serial No. 244,654. Renewed August 16, 1933

4 Claims. (Cl. 23—264)

This invention relates to an improvement in an apparatus for the recovery of aluminum chloride from the residue of aluminum chloride oil refining and its novelty lies in the adaptation and arrangement of parts as will be more fully hereinafter pointed out.

The subject matter of this application is divided out from our co-pending application serial No. 161,078 filed January 14, 1927, now Patent 1,835,279.

In the refining of oil where aluminum chloride is used as the catalyst there comes a time when the continuous process of feeding oil and aluminum chloride into the refining still must cease because of the accumulation of a large quantity of sludge which so impedes the progress of refining that it is uneconomical to proceed further. The point at which this occurs varies with the efficiency of the various processes used, but the final result is always the same in the aluminum chloride oil refining processes and the sludge resulting is largely carbon in which the aluminum chloride is locked up and there is also some heavy oil residue combined therewith. This sludge, however, can be broken up in the bottom of the still and taken out in a more or less cokey condition when the still is cleaned.

Our apparatus is adapted to take this sludge which results at the end of a continuous or batch operation in refining mineral oil with aluminum chloride and by grinding and regrinding said sludge until it is pulverized to the finest form obtainable and carrying this out in a drum maintained at a temperature sufficient to drive off the aluminum chloride so exposed and also that which is bound to the hydrocarbons to thereby recover all or substantially all of the aluminum chloride which is enmeshed or bound into the carbon, hydrocarbons or sludge thereby recovering the aluminum chloride for reuse in the distilling of mineral oil and simultaneously drawing off from said sludge any oil residue which may be bound therein.

Our apparatus therefore makes possible the economic recovery of the aluminum chloride which becomes bound into the sludge of the residue resulting from the distilling of mineral oil in the use of aluminum chloride as the catalyst. It also serves to recover any oil and carbon which are also bound in such sludge or residue making them both available for commercial use.

The most desirable agent for the recovery of a high percentage of low boiling oils of desired quality from mineral oil is aluminum chloride but the high cost of aluminum chloride combined with the loss of unused aluminum chloride in the sludge resulting from all such distilling processes has made the use of aluminum chloride uneconomical in competition with other distilling processes in which aluminum chloride is not used. Our process in furnishing a means of recovering all or substantially all of the recoverable aluminum chloride heretofore lost in the sludge or residue from the aluminum chloride oil refining processes so reduces the cost of the use of aluminum chloride in the distilling of mineral oil that it makes it economically feasible to use this most desirable refining agent.

Referring to the drawing Figure 1 is a side elevation of our complete apparatus, certain portions being broken away for convenience in illustration.

Figure 2 is a perspective in detail of one of the crushing and feeding arms.

In the drawing 3 is a furnace of usual construction having a frame 4 rigidly secured thereon at 14 in the usual and well known manner and an outer frame portion 5 also rigidly secured to the top of the furnace 3 at 12 in the usual well known manner so that a bearing 6 at the head of the same is in alignment with bearings 7 and 8 of offset bearing frames 9 and 10 rigidly secured to the frame 4 in the usual well known manner at 11. A drum or cylinder 13 is rigidly secured between base plates 15 and 16 of said offset bearing frames 9 and 10.

A shaft 17 is mounted in said bearings 7 and 8 so as to rotate freely therein and on the outer end of said shaft 17 is mounted in the usual well known manner a pulley 18 of usual construction and a belt connection to a source of power (not shown), this being of usual well known construction. A pipe 19 is rigidly secured to one end of the drum 13 and at the upper end of said pipe 19 is rigidly secured a feed hopper 20 in which is mounted a suitable feeding mechanism 21 of usual construction adapted to feed the sludge or residue in an even and continuous manner. A control valve 22 of usual construction is mounted in the pipe 19 below the feed hopper 20. At the opposite end of the drum 13 from pipe 19 is rigidly mounted a second pipe 23 having a control valve 24 of usual construction and terminating in a condensing chamber 25 of usual construction and to the upper side of said condenser 25 is rigidly secured a pipe 26 adapted to carry off the aluminum chloride vapors to a suitable receptacle (not shown). The lowest point in the condenser 25 terminates in a pipe 27 which is adapted to lead to an oil receiving or containing means (not shown) to catch the oil condensed in said condenser 25. A pipe 28 is rigidly secured to the bottom of the drum 13 directly opposite pipe 23 and is adapted to take off into the receiving receptacle 29 to which said pipe 28 is secured all of the carbon and other residue which may remain.

The portion of the shaft 17 lying within the drum 13 is preferably of a hexagonal shape and a series of eccentric crushing and pushing arms 30 having hexagonal openings therethrough at 31 are adapted to be mounted thereon in a continuous staggered relation and said eccentric crushing and pushing arms 30 have lip portions 32 which serve to push the sludge or residue slightly forward on each revolution and these are arranged so as to point towards the exit or pipe 28 and faces 33 of said arms 30 are the grinding faces which as they rotate are so close to the inner surface of the drum 13 all the way around that any sludge or residue material being treated lying within the range of their rotation is crushed rolled and finely ground between said faces 33 and the inner side of the drum 13.

In using our apparatus the sludge or residue from the aluminum chloride oil refining process is dumped into the feed hopper 20 and as the furnace 3 is in full operation, heating the drum 13 to the temperature necessary to drive off the aluminum chloride from said residue, the shaft 17 is put into operation by means of the application of power to the belt (not shown), running over the pulley 18 whereby the shaft 17 and the eccentric crushing and pushing arms 30 will be rotated continuously always maintaining their staggered relation as mounted on the shaft 17 and as the residue comes down the pipe 19 into the drum 13, said sludge or residue will be crushed by the faces 33 of the eccentric arms 30 against the inner wall of the drum 13 and upon each rotation of each of the arms 30 the lips 32 will serve to push forward a slight portion of the residue or sludge so that said sludge or residue will be crushed by each of the arms 30 a number of times before it is fed forward to the next arm 30 which will crush it still further whereby the sludge or residue will be pulverized to the finest form during its travel through the drum 13 and all or substantially all of the aluminum chloride bound in said sludge or residue will be released and as the aluminum chloride is thereby exposed mechanically the heat at which the drum 13 is maintained will drive off said aluminum chloride and the same will be carried out through the pipe 23 through the chamber 25 and through pipe 26 to a suitable container at the end of pipe 26 (not shown).

As the residue being treated is pushed forward and crushed and recrushed many hundreds of times before it finally reaches pipe 28, all or substantially all of the aluminum chloride in vapor or solid form in said residue has a full opportunity to be exposed to the heat in the drum 13 whereby it will all be driven off as described and the oil which may be in said sludge or residue will also be driven off by the heat of said drum 13 and will pass off through pipe 23 and be condensed in condenser 25 and drawn off through pipe 27 into the container (not shown). The portion of the residue or sludge which has not been driven off by the heat in the drum 13 as it reaches the pipe 28 will fall down through said pipe into the container 29 and will be substantially a pure carbon free from oil and aluminum chloride.

It is quite apparent that many variations may be made in the apparatus disclosed without departing from the spirit and intent of our invention and that our apparatus is adapted to be used for preparing material for and distilling off many different chemical substances which may be distilled.

I claim:

1. In an apparatus for recovering a mechanically bound chemical agent from the residue of a chemical process, means for feeding said residue uniformly to a drum, means for slightly advancing and repeatedly grinding and regrinding all of said residue to a very fine powder during its slow advance through said drum comprising rotating means which at their outer ends rotate closely adjacent to the interior of said drum, means for maintaining a temperature throughout said drum sufficient to drive off all of the mechanically bound chemical agent exposed by said crushings, and means for collecting and condensing said mechanically bound chemical agent.

2. In an apparatus for recovering a mechanically bound chemical agent from the residue of a chemical process, means for feeding said residue uniformly to a drum, means for slightly advancing and repeatedly crushing and grinding said residue to a very fine powder during its slow advance through said drum comprising rotating means which at their outer ends barely escape contact with the interior of said drum, means for maintaining a temperature throughout said drum sufficient to drive off all of the mechanically bound chemical agent exposed by said grinding to a fine powder, means for collecting said mechanically bound chemical agent, and means for collecting and drawing off the oil and waste material separately.

3. In an apparatus for recovering a mechanically bound chemical agent from the residue of a chemical process, means for feeding said residue uniformly to a drum, means for slightly advancing and grinding said residue repeatedly during its slow advance through said drum comprising a series of crushing and pushing arms mounted in a continuous staggered series on a central rotating shaft running through said drum, means for maintaining a temperature throughout said drum sufficient to drive off all of the mechanically bound chemical agent exposed by said crushings, and means for collecting and condensing said mechanically bound chemical agent.

4. In an apparatus for recovering a mechanically bound chemical agent from the residue of a chemical process, means for feeding said residue uniformly to a drum, means for slightly advancing and grinding said residue reqeatedly during its slow advance through said drum comprising a series of crushing and pushing arms mounted in a continuous staggered series on a central rotating shaft running through said drum, means for maintaining a temperature throughout said drum sufficient to drive off all of the mechanically bound chemical agent exposed by said grinding, means for collecting and condensing said mechanically bound chemical agent, and means for collecting and drawing off the oil and waste material separately.

BYRON E. CARL.
WILLIAM S. AUSTIN.